United States Patent
Ives et al.

(10) Patent No.: US 6,621,690 B2
(45) Date of Patent: *Sep. 16, 2003

(54) FOAM SYSTEMS FOR PROTECTING DISK DRIVES FROM MECHANICAL DISTURBANCES

(75) Inventors: Thomas W Ives, Boise, ID (US); Donald P Roehling, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 22 days.

This patent is subject to a terminal disclaimer.

(21) Appl. No.: 09/946,433

(22) Filed: Sep. 5, 2001

(65) Prior Publication Data

US 2002/0172006 A1 Nov. 21, 2002

Related U.S. Application Data

(63) Continuation-in-part of application No. 09/859,850, filed on May 16, 2001.

(51) Int. Cl.[7] .................................................. G06F 1/16
(52) U.S. Cl. ........................................ 361/682; 206/307
(58) Field of Search ................................ 206/307, 521, 206/523, 524, 585–594, 524.1–524.9; 361/682

(56) References Cited

U.S. PATENT DOCUMENTS 5,058,745 A * 10/1991 Warner et al. ............... 206/523
6,018,456 A * 1/2000 Young et al. ................ 361/684
6,242,691 B1 * 6/2001 Reese et al. ................ 174/34 R

FOREIGN PATENT DOCUMENTS

| DE | 29905846 | 6/1999 |
| EP | 0845782 A1 | 6/1998 |
| GB | 2377075 | 12/2002 |

* cited by examiner

Primary Examiner—Darren Schuberg
Assistant Examiner—Yean-Hsi Chang

(57) ABSTRACT

A disk drive enclosure system includes an enclosure, a cage configured to mount a plurality of disk drives, and foam between the cage and the enclosure. The foam is characterized by a compliance, and has a plurality of voids selectively formed therein. The voids can be selectively formed to thereby increase the compliance of the foam. The voids can be formed through the entire thickness of the foam, or through only a portion of the thickness. The voids can be configured to form cooling air passages for cooling air circulated in the disk drive enclosure system. The foam can be a foam system having foam components, and the voids can be formed only in selected ones of the foam components. The enclosure system can include a plurality of disk drives mounted to the cage, and the voids can be located near the disk drives.

21 Claims, 11 Drawing Sheets

FOAM SYSTEMS FOR PROTECTING DISK DRIVES FROM MECHANICAL DISTURBANCES

CROSS REFERENCE TO RELATED APPLICATIONS

This application claims priority to, and is a continuation-in-part of, U.S. patent application Ser. No. 09/859,850, filed May 16, 2001, and entitled, "FOAM SYSTEMS FOR PROTECTING DISK DRIVES FROM MECHANICAL DISTURBANCES."

FIELD OF THE INVENTION

The invention claimed and disclosed herein pertains to protection of disk drives in disk array systems, such as a Redundant Array of Independent Disks ("RAID") storage system, from external and/or internal mechanical disturbances. The present invention especially relates to the use of viscoelastic foam materials to protect arrays of disk drives from such disturbances.

BACKGROUND OF THE INVENTION

Since RAID storage systems are one of the most important forms of disk drive arrays, they will be used to illustrate and differentiate the present invention. However, it is understood that the present invention pertains to the protection of disk drives in any disk array system. Generally speaking, RAID storage systems are arrays of disk drives ("DDs") controlled by one or more controllers. Higher data transfer rates are achieved through the ability of the system's controller to schedule, read and write commands to multiple DDs in a parallel fashion. Such storage systems employ one or more motor driven spindles that rotate the DDs at several thousand revolutions per minute. Such systems also have a printed circuit board that receives commands from the controller and translates them into voltage fluctuations that cause a head actuator to move an array of ganged read/write heads across a complimentary array of disks. The head actuator must push and pull each gang with the extreme precision required to properly position a given head with select tracks that lie in concentric circles on the surface of a disk being served by that head. In short, disk drive systems are very precise, and very delicate, pieces of equipment that must be protected from mechanical shocks and vibrations—from whatever source.

Therefore, owing to their mechanical sensitivities, these systems are shipped to their end users in external packaging systems that include extra and/or specifically designed, and hence expensive, foam padding systems. Those skilled in the disk drive arts also will appreciate that a RAID system's DDs are especially susceptible to external mechanical disturbances. Consequently, these DDs are shipped separately from the rest of the RAID system. The individual DDs are usually placed in compartmentalized, foam-lined, boxes and static electricity resistance bags. Aside from its greater packaging and shipping costs, this practice also adds a great deal to the setup time when a RAID system is unpacked and installed.

Aside from carefully packing their products for shipping in external foam padding systems, RAID system manufacturers also have provided compliant mounting systems for individual DDs in order to protect them from external mechanical disturbances during use of the RAID system. For example, some manufacturers have followed the practice of placing a compliant medium between each DD and the structure to which the individual DDs are mounted. These DDs are mounted to their support structure in this compliant manner in order to filter potentially harmful external mechanical disturbances. Unfortunately, a RAID's throughput performance can be diminished as a result of this type of compliant mounting of individual DDs to their DD support structure. That is to say that, under the compliant mounting conditions between the individual DDs and the DD support structure, the DDs can exhibit diminished throughput performance due to certain self-induced vibrations, which the compliant mountings permit to occur. For example, under these compliant mounting conditions, servomechanism movements of individual DDs can cause rotational vibration disturbances that can cause one or more DDs in a DD array to become self-disturbed or self-excited. It is also possible for DDs to be adversely affected by translational forces from external sources after they are placed in operation. These forces can cause a temporary misalignment of the magnetic head used to read and write date from and to the magnetic disk medium in the DD. This temporary misalignment can in turn result in a read/write data error, requiring the data to be re-read from, or rewritten to, the magnetic media, affecting the performance (rate of data transfer) of the RAID system.

What is needed then is a disk array system, which achieves the benefits to be derived from similar prior art devices, but which avoids the shortcomings and detriments individually associated therewith.

SUMMARY OF THE INVENTION

One embodiment the invention provides for a disk drive enclosure system having an enclosure and a cage configured to mount a plurality of disk drives. The disk drive enclosure system also includes foam between the cage and the enclosure. The foam, which has characteristics of compliance (i.e., deformation under a load) and damping (i.e. resistance to movement that is proportional to speed), has a plurality of voids selectively formed therein. Preferably, the voids are selectively formed to thereby increase the compliance of the foam over a similar foam which does not have the voids selectively formed therein. That is, the compliance of the foam can be "tuned" or adjusted (typically increased) by selectively forming the voids in the foam. The voids can be formed through the entire thickness of the foam so as to form open passageways in the foam. The voids can also be formed through only a portion of the thickness of the foam to basically form pockets in the foam. The foam can be a foam system, which includes a plurality of foam components, in which case the voids can be formed only in selected ones of the foam components. In one variation the foam is fabricated from a plurality of foam pieces having different geometries, and the differences in the geometries of the foam pieces define the voids in the overall foam.

In another variation the voids are configured to form cooling air passages for cooling air circulated in the disk drive enclosure system. In this instance the voids can be in the form of channels in the foam, or openings through the foam, which form the cooling air passages. The voids can thus be selectively sized and located within the foam to not only tune the compliance of the foam to a desired level, but also to facilitate the flow of cooling air in the disk drive enclosure system. Since the disk drive enclosure system is configured to receive a plurality of disk drives, in this instance the voids can be located proximate to the locations where the disk drives will be mounted to the cage.

A further embodiment of the present invention provides for a method of increasing compliance of a foam component of a foam system used in a disk array system, the foam system configured to insulate disk drives in the disk array system from mechanical shock and vibration. The method includes providing a foam component of the foam system, and selectively forming a plurality of voids in the foam component. The voids are preferably selectively formed to thereby increase the compliance of the foam component (i.e., to cause an increase between the state where the voids are not yet formed in the foam component, and the state where the voids are formed in the foam component).

Typically, the foam component will be defined by a first compliance prior to forming the voids therein. Then, after the voids are formed in the foam component it will be defined by a second compliance, the second compliance being higher than the first compliance. That is, the voids can make the foam component more compliant, or subject to greater deformation under a constant load. The second compliance can be a predetermined compliance, and the voids can be formed in the foam component until the second compliance is achieved. That is, the compliance of the foam component can be "tuned" or adjusted by forming the voids until the desired compliance is achieved.

These and other aspects and embodiments of the present invention will now be described in detail with reference to the accompanying drawings, wherein:

DETAILED DESCRIPTION OF THE INVENTION

Figure 1:
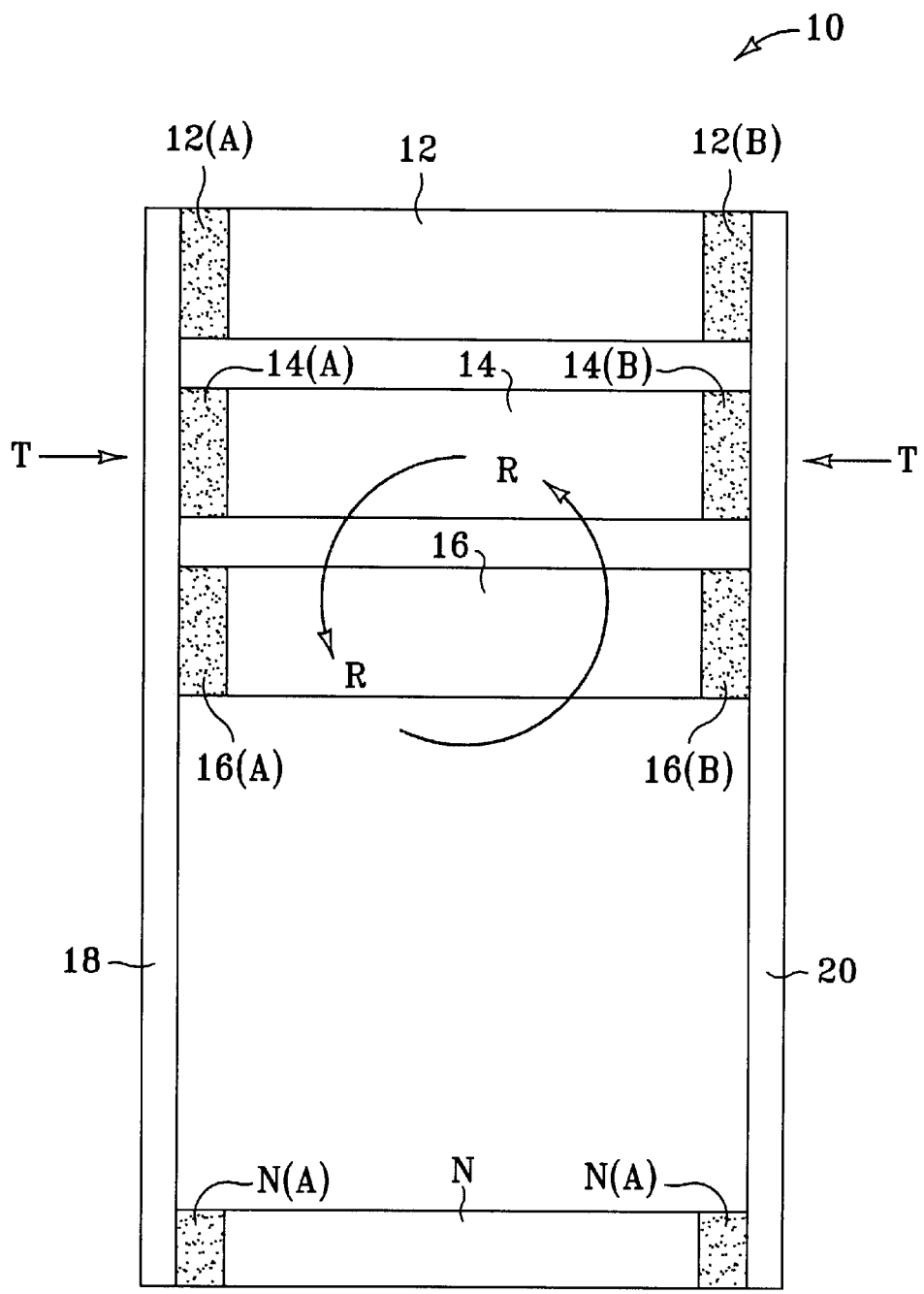
FIG. 1 depicts a front elevation view of a prior art method of mounting individual DDs to a DD support structure.

FIG. 1 depicts a plurality or array of DDs 12, 14, 16 . . . N of a disk drive system such as a RAID system. Again, since RAID storage systems are one of the most important forms of disk drive arrays, they will be used to illustrate the present invention. Those skilled in this art will however appreciate that other kinds of disk drive arrays can be protected by the practice of this invention. In any case, FIG. 1 depicts a RAID system mounted between two mounting elements 18 and 20. This mounting is according to a prior art mounting device (the mounting and/or fastener devices used therein are not shown) in which each individual DD is mounted compliantly on each of its ends. For example, DD 12 is shown compliantly mounted through use of a layer of compliant material 12(A) on its left end and compliantly mounted through use of a layer of complaint material 12(B) on its right end. Similar mountings are shown on DDs 14, 16 . . . N. Again, these prior art mounting devices serve to filter harmful external mechanical disturbances (e.g., translational forces T) from the DDs. They are not, however, effective devices for damping self-induced DD vibrations. Again, this is not the best of circumstances because self-induced DD vibrations are capable of lowering the throughput performance of disk drive arrays in general, and RAID systems in particular.

Figure 2:
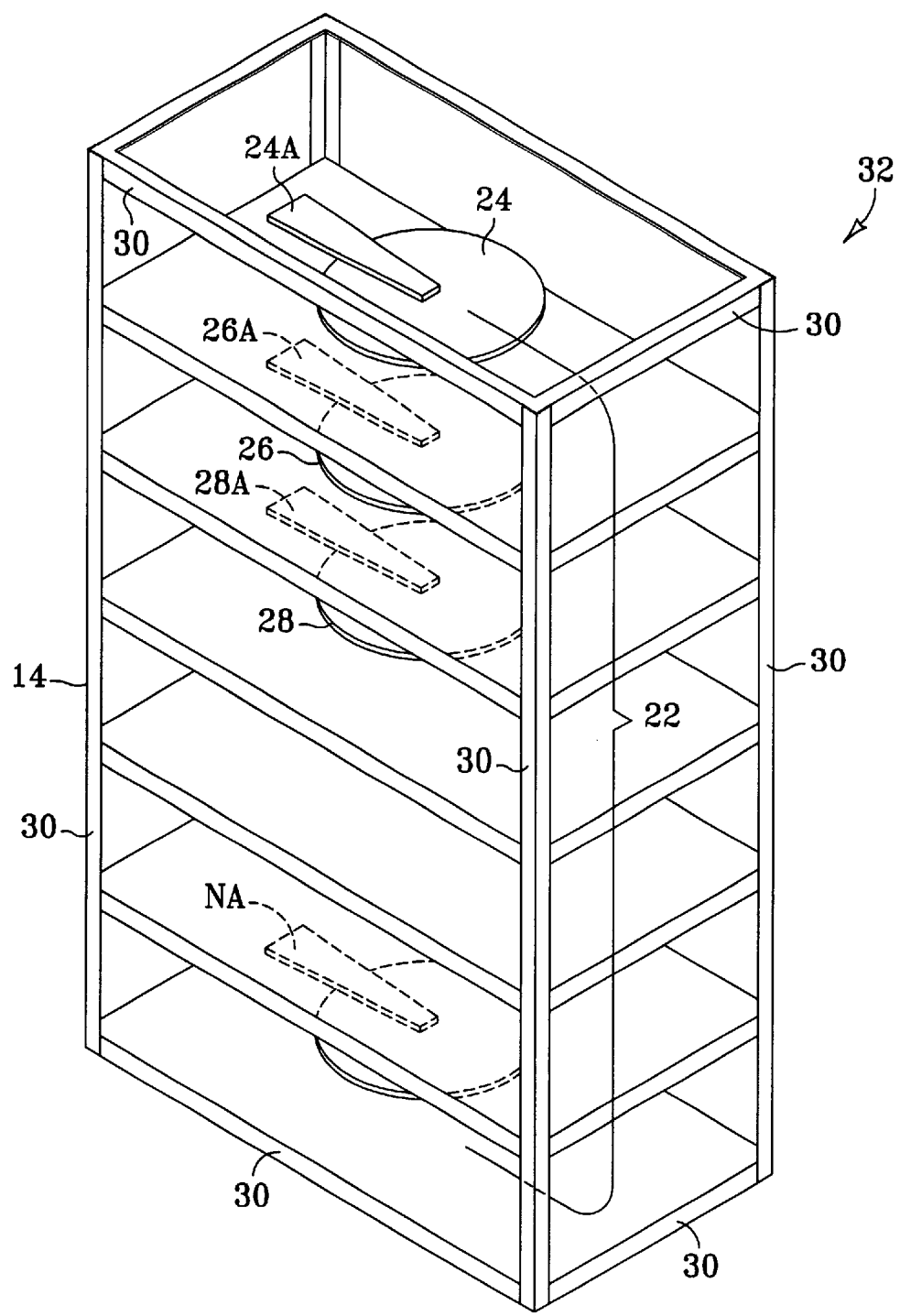
FIG. 2 depicts an isometric view of a DD array to be protected by the methods of the present invention attached to a mounting cage and thereby creating a DD/mounting cage assembly.

FIG. 2 depicts an array 22 of DDs 24, 26, 28 . . . N each of which is associated with at least one ganged arm (e.g., arm 24A, arm 26A, arm 28A, etc.) that carries a read/write head (not shown) over the surface of a given disk in ways well known to this art. In accordance with the present invention, the DD array 22 is shown mounted to a DD mounting cage 30 and thereby creating a DD/mounting cage assembly 32. Thus, the mounting cage 30 is the means by which the individual DDs 24, 26, 28 . . . N of the DD array 22 are mounted in space with respect to each other. In FIG. 2, layers of compliant material, such as those shown in FIG. 1, are not positioned between the individual DDs and the mounting cage 30. Rather, the DDs are rigidly mounted to the mounting cage 30. That is to say that there is no intentional compliant mounting between the individual DD units and the mounting cage 30 as there is in the prior art mounting method depicted in FIG. 1. The rigid mounting of the individual DDs to the mounting cage 30 in this embodiment of the present invention can be means of a variety of fastener, connector or locking devices that are well known to those skilled in this art, but deleted from these drawings for the sake of visual clarity. Preferably, the DDs 22 are mounted in the mounting cage 30 a manner which allows them to be individually removed from the DD array 22 for servicing or replacement without affecting the integrity of the mounting cage 30 and without requiring the removal of other DDs in the array.

By rigidly mounting the individual DDs 24, 26, 28, etc. to the mounting cage 30, the sum total of self excitations per unit of mass of the overall DD/mounting cage assembly 32 will be reduced for at least three reasons. First, combined random excitations will reduce excitation per individual DD. Second, the additional mass of the rigid DD/mounting cage assembly 32 raises the inertia of that assembly and thus further reduces an individual DD's dynamic responses to self excitations. Third, any combined random excitations will tend to reduce overall excitation per unit of inertia of the DD/mounting cage assembly 32. Owing to these inertia considerations, the mounting cage 30 of the DD/mounting cage assembly 32 preferably is made of a metal such as steel (as opposed to a relatively lighter material such as plastic). It also is possible for self excitations among such an array of DDs to synchronize. To guard against this possibility, some of the DDs can be mounted in an "upside down" fashion. For example, alternating DDs can be rotated 180 degrees about their mounting axis (i.e., an axis along which the DD is inserted into the mounting cage). This mounting arrangement tends to cancel synchronized self excitations.

Figure 3:
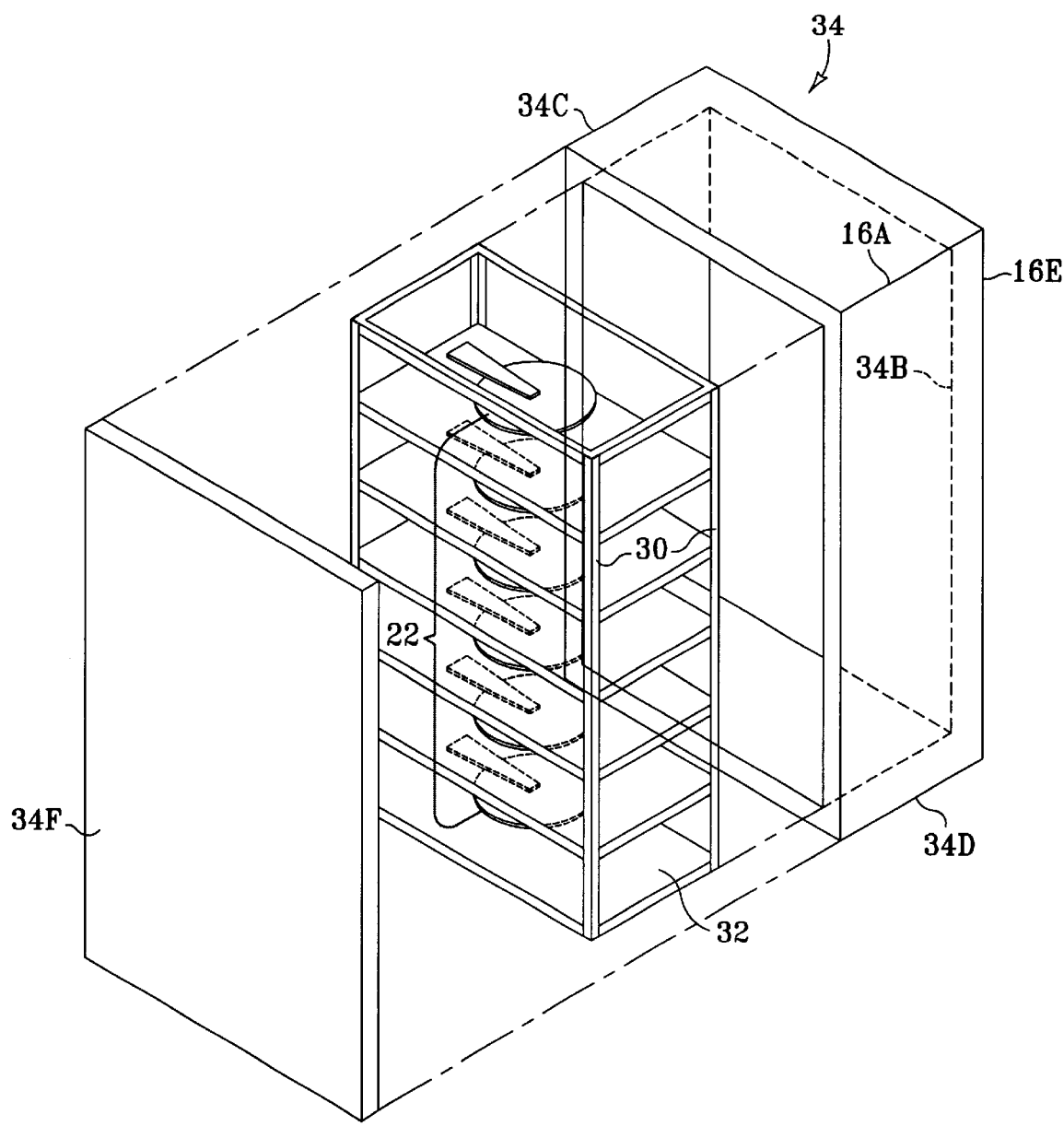
FIG. 3 depicts an isometric view of the DD/mounting cage assembly shown in FIG. 2 being placed inside a foam system to create a DD cage/foam system.

FIG. 3 depicts the DD/mounting cage assembly 32 of FIG. 2 being placed in a foam system 34. This foam system 34 can have top, side, bottom and rear components that are unified with each other to form a box-like foam structure such that shown in FIG. 3. In the alternative, the foam system 34 can be comprised of physically separate and distinct foam components such as those shown in FIGS. 8 and 9. In any case, FIG. 3 depicts a box-like, foam system 34 having a top 34A, a right side 34B, a left side 34C, a bottom 34D and a rear 34E that constitute one unified body by virtue of the foam having been molded in this box-like configuration. Such a box-like structure 34 can have ports (not shown) for electrical wiring (not shown) to connect the DDs to other electrical components of the RAID system and to form adequate openings for airflow for cooling of the DDs within the box-like structure. The front face of the foam layer system 34 is shown being provided with a front piece 34F that, in effect, serves as a "lid" to the six sided, box-like foam system 34. Thus, the DD/mounting cage assembly 32 shown in FIG. 3 can be thought of as about to be inserted into and completely surrounded by the foam system 34. The result of placing the DD/mounting cage assembly 32 in such a foam system 34 is an assembly that we will refer to as a "DD/mounting cage/foam system".

The compliance and dampening characteristics of the foam used to make such a foam system 34 can be modified by various mechanical means. For example, these characteristics can be modified simply by varying a foam's thickness. Thus, a thicker piece of foam placed in a given space between a DD/mounting cage assembly 32 and an enclosure system 36 can result in compression (or greater compression) of the foam in a given location. Such a foam system 34 can also be modified mechanically through use of layers of different types of foam and/or placement of such different types of foam at different positions in the foam system 34.

Some foams can, for example, have the desired amount of damping, but not the desired amount of compliance. Other foams can have the desired amount of compliance, but the wrong amount of damping. By layering different kinds of foam, optimal damping and compliance characteristics for an overall two-ply foam system such as that shown in FIG. 6 can be achieved. Thus, two or more layers of different types of commercially available foam can be employed to obtain specifically desired damping and compliance characteristics, without having to design and make specific foams having various desired damping and compliance characteristics. These foams also can be "tuned" by changing their chemical compositions. This will be described further below.

Figure 4:
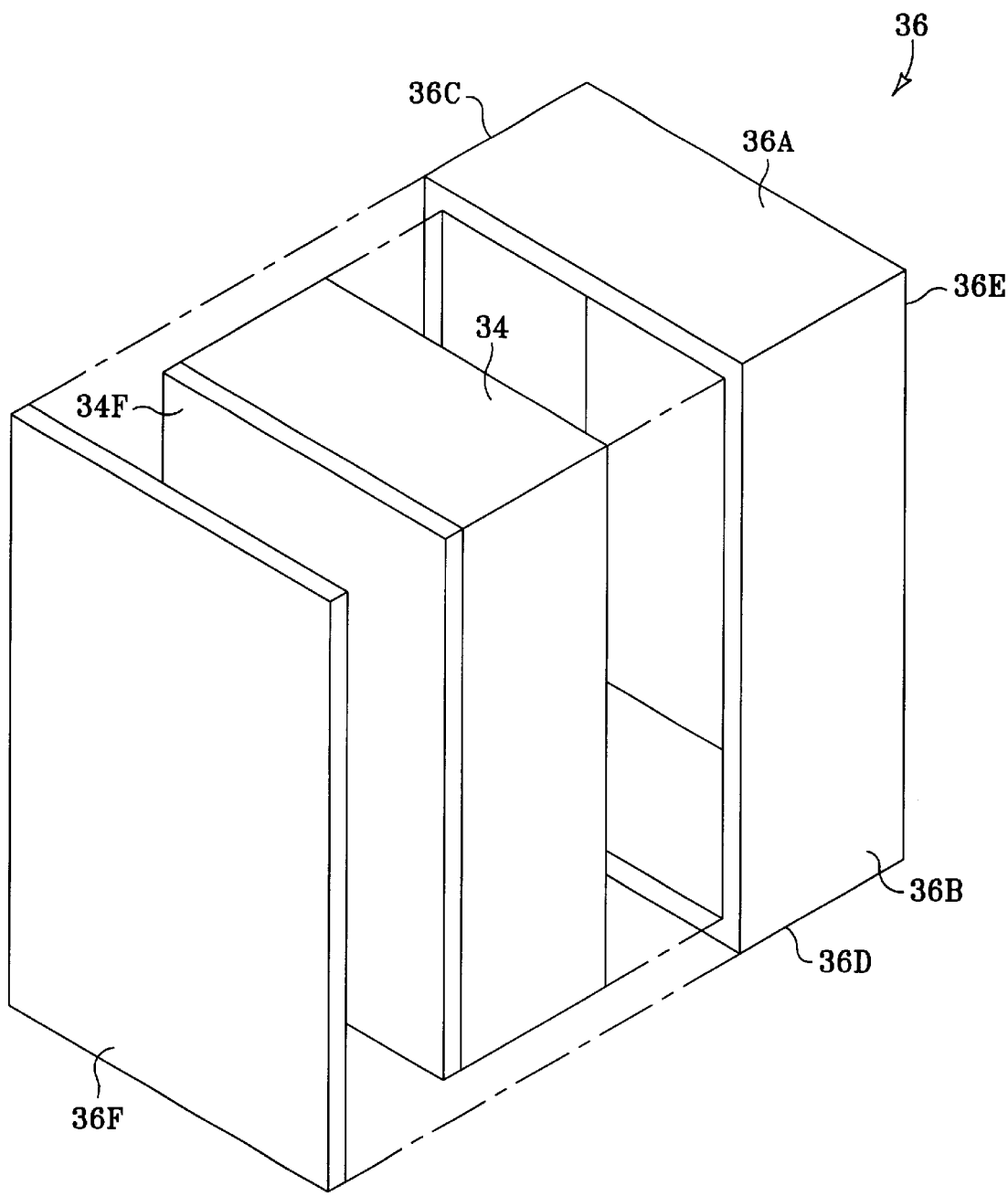
FIG. 4 depicts an isometric view of the DD cage/foam system of FIG. 3 being placed in an enclosure to create a DD/mounting cage/foam/enclosure system.

FIG. 4 depicts the foam system 34 (and the DD/mounting cage assembly 32 contained in it, as shown in FIG. 3) being mounted inside an enclosure 36. Thus, the rectangular solid-configured foam system 34 shown in FIG. 4 resides between the DD/mounting cage assembly 32 and the enclosure 36. The enclosure 36 is shown having a comparable box-like configuration. This box-like configuration is not, however, a requirement for the enclosure 36. Any given side, or sides, of the enclosure 36 can be missing from the depiction shown in FIG. 4. In some more preferred embodiments of this invention, however, the enclosure 36 will have at least four sides. In other preferred embodiments, a DD/mounting cage assembly 32 having a rectangular, solid or box-like configuration, will reside in a six sided enclosure 36 and have a layer of foam on all six of its sides. Moreover, one or more of these six layers of foam can be in a state of compression between the DD/mounting cage assembly 32 and the enclosure 36. In one particularly preferred embodiment of this invention, all six sides of a DD/mounting cage assembly 32 will be in contact with a foam layer that is in a state of compression.

Figure 5:
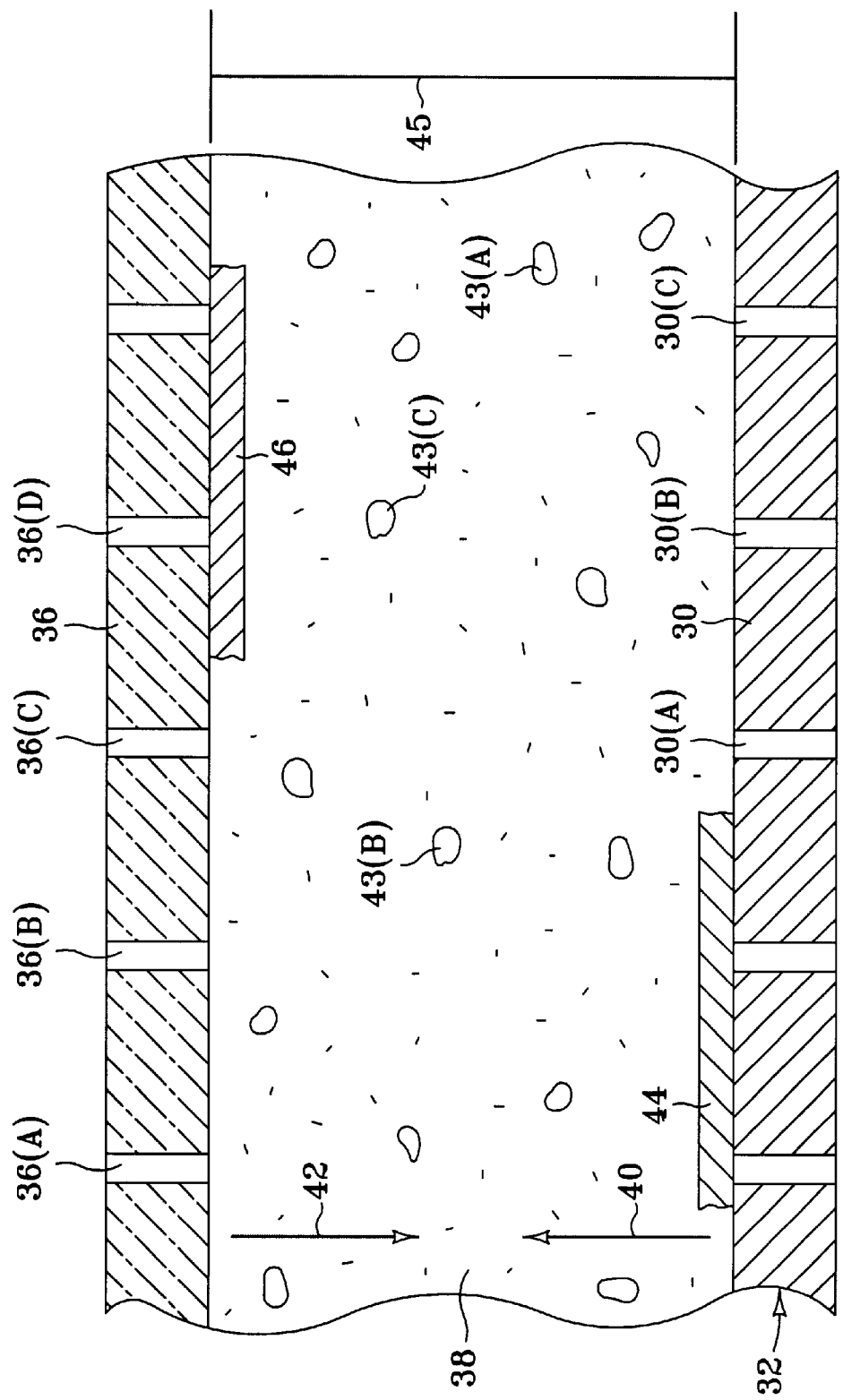
FIG. 5 depicts a cross sectional detail of a DD/mounting cage/foam/enclosure system in accordance with the present invention.

FIG. 5 depicts a layer of foam 38 placed between a cage element 30 of a DD/mounting cage assembly 32 and an enclosure system 36 element. Direction arrows 40 and 42 are intended to suggest that the foam layer 38 can be (but need not be) in a state of compression between the DD/mounting cage assembly 32 and the enclosure 36. FIG. 5 also depicts how the layer of foam 38 and/or the DD/mounting cage assembly 32 can be provided with a layer of adhesive material 44. Such a layer of adhesive can be used to position the foam 38 with respect to the DD/mounting cage assembly 32—especially in those circumstances where the foam layer 38 is not placed in a state of compression between the DD/mounting cage assembly 32 and the enclosure 36. Likewise, the foam layer 38 and/or enclosure 36 can be provided with a comparable layer of adhesive 46 to aid in positioning the foam layer 38 with respect to the enclosure 36. Suitable adhesives for foam placement purposes include high-modulus adhesives such as acrylic adhesives or epoxy adhesives.

FIG. 5 also illustrates use of foam materials that have an array of void spaces 43(A), 43(B), 43(C), etc. distributed throughout the body of the foam material. Foam materials having such void spaces distributed throughout their bodies are well known to the foam manufacturing arts. By way of example only, U.S. Pat. No. 5,587,231 ("the '231 patent"), U.S. Pat. No. 5,888,642 ("the '642 patent") and U.S. Pat. No. 3,640,787 ("the '787 patent"), all of which are incorporated by reference herein, teach foams having an array of such void spaces. These void spaces can be designed into a foam by the use of various chemical ingredients, and/or relative proportions thereof, in order to vary a foam's mechanical compliance damping characteristics. Such void spaces also give a foam the quality of air porosity or so-called "breathability". This breathability enables air to more easily pass through the foam. It also should be noted that the thickness 45 of the foam layer(s) used in the practice of this invention can vary depending upon a number of factors such as the size of the space between the DD/mounting cage assembly 32 and the enclosure 36, the type of foam material selected and the size and distribution of void spaces within that foam.

Figure 6:
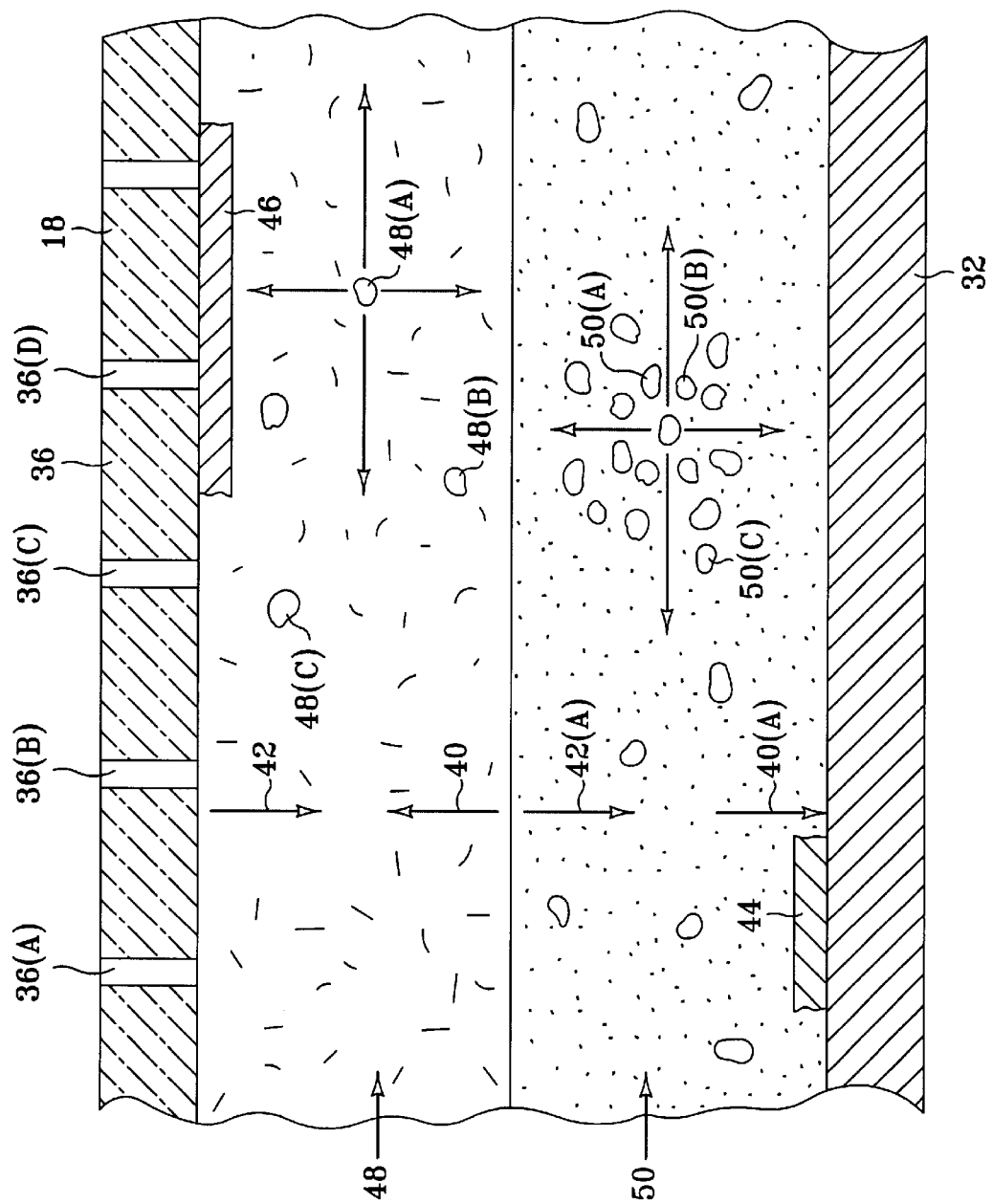
FIG. 6 depicts a cross sectional detail of a DD/mounting cage/foam/enclosure system wherein an overall foam system is comprised of two distinct foam layers in accordance with the present invention.

FIG. 6 depicts another foam layer system comprised of two distinct layers 48 and 50 of foam. These two sublayers can have the same, or different, physical thicknesses, and/or mechanical or chemical properties. For example, FIG. 6 depicts foam layer 48 provided with an array of void spaces 48(A), 48(B), 48(C), etc. that are relatively smaller and relatively more sparsely distributed compared to the void spaces 50(A), 50(B), 50(C), etc. in foam layer 50. Again, layers of different foams can be combined to give an overall foam layer (foam layer 48 plus foam layer 50) desired overall damping, compliance, etc. characteristics. It also should be appreciated that 3, 4, 5, etc. layers of foam can be employed in such multiple-ply foam layer systems.

Figure 7:
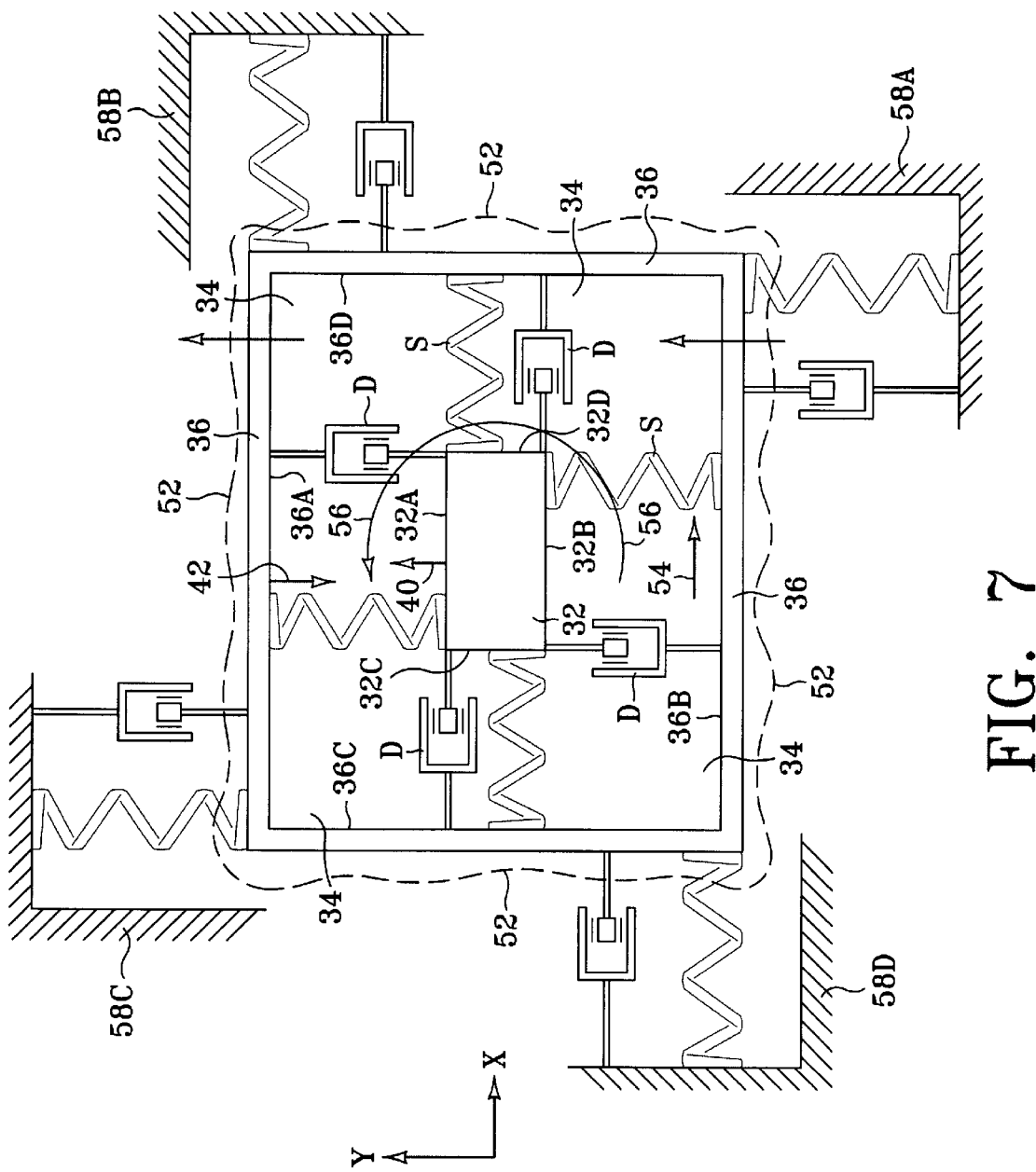
FIG. 7 is a conceptualized depiction of a DD/mounting cage/foam/enclosure system/external housing system in accordance with the present invention.

FIG. 7 depicts a conceptualization of this invention using the "spring and dashpot" symbols commonly used to depict the mechanical properties of viscoelastic materials such as foams. In this conceptualization, the DD array 22 shown in FIG. 2 can be regarded as having been placed in a mounting cage 30 to create the DD/mounting cage assembly 32 shown in FIG. 7. This DD/mounting cage assembly 32 can be thought of as being surrounded by a foam system 34 such as that shown in FIG. 3. Thus, the foam system 34 is positioned between the DD/mounting cage assembly 32 and the enclosure 36. The resulting system is conceptualized in FIG. 7 by placement of spring S and dashpot D symbols at each of the four corners of the DD/mounting cage assembly 32. It will be appreciated that this two dimensional (X-Y coordinate) presentation will apply just as well to three dimensional (X-Y-Z coordinate) systems. In any case, the foam layer system 34 depicted in FIG. 7 by the spring S and dashpot D symbols also can be regarded as being in a state of compression between the DD/mounting cage assembly 32 and the enclosure system 36. For example, a state of compression of the foam 34 between the inside of the top 36A of the enclosure system 36 and the outside of the top 32A of the DD/mounting cage assembly 32 is depicted by arrows 40 and 42—as it was in FIG. 5.

The foam 34 can be (but need not be) compressed between the bottom 32B of the DD/mounting cage assembly 32 and the inside of the bottom 36B of the enclosure system 36. Similar compressive forces can be experienced by the foam between the left side 36C of the enclosure system 36 and the left side 32C of the DD/mounting cage assembly 32. The same is true of the foam 34 between the right side 32D of the DD/mounting cage assembly 32 and the right side 36D of the enclosure system 36. And here again, a similar depiction can involve a depth dimension Z of this spring S and dashpot D system. Be that as it may, the resulting DD/mounting cage/foam/enclosure system shown in FIG. 7 is enclosed by a generalized dotted line encirclement 52. It is through use of this DD/mounting cage/foam/enclosure system (52) that the DD/mounting cage assembly 32 (and hence the individual DDs it contains) is protected against translational mechanical forces such as that depicted in FIG. 7 by linear arrow 54. It is also protected against rotational mechanical torques such as those depicted by curved arrow 56. Protection against self-induced rotational mechanical torques 56 is, however, especially achieved through the individual DDs being rigidly mounted to the mounting cage 30.

The encircled system (52) depicted in FIG. 7 is also shown mounted in an external housing. This mounting of the DD/mounting cage assembly/foam/enclosure system (shown generally encircled by dotted line 52) within the external housing can take place at various locations 58A, 58B, 58C, 58D, etc. on the RAID housing. This mounting can be by known mechanical fastener, connector, lock, etc. mounting means. In some of the more preferred embodiments of this invention, however, viscoelastic materials can be positioned between the external housing and the DD/mounting cage assembly/foam/enclosure system.

Figure 8:
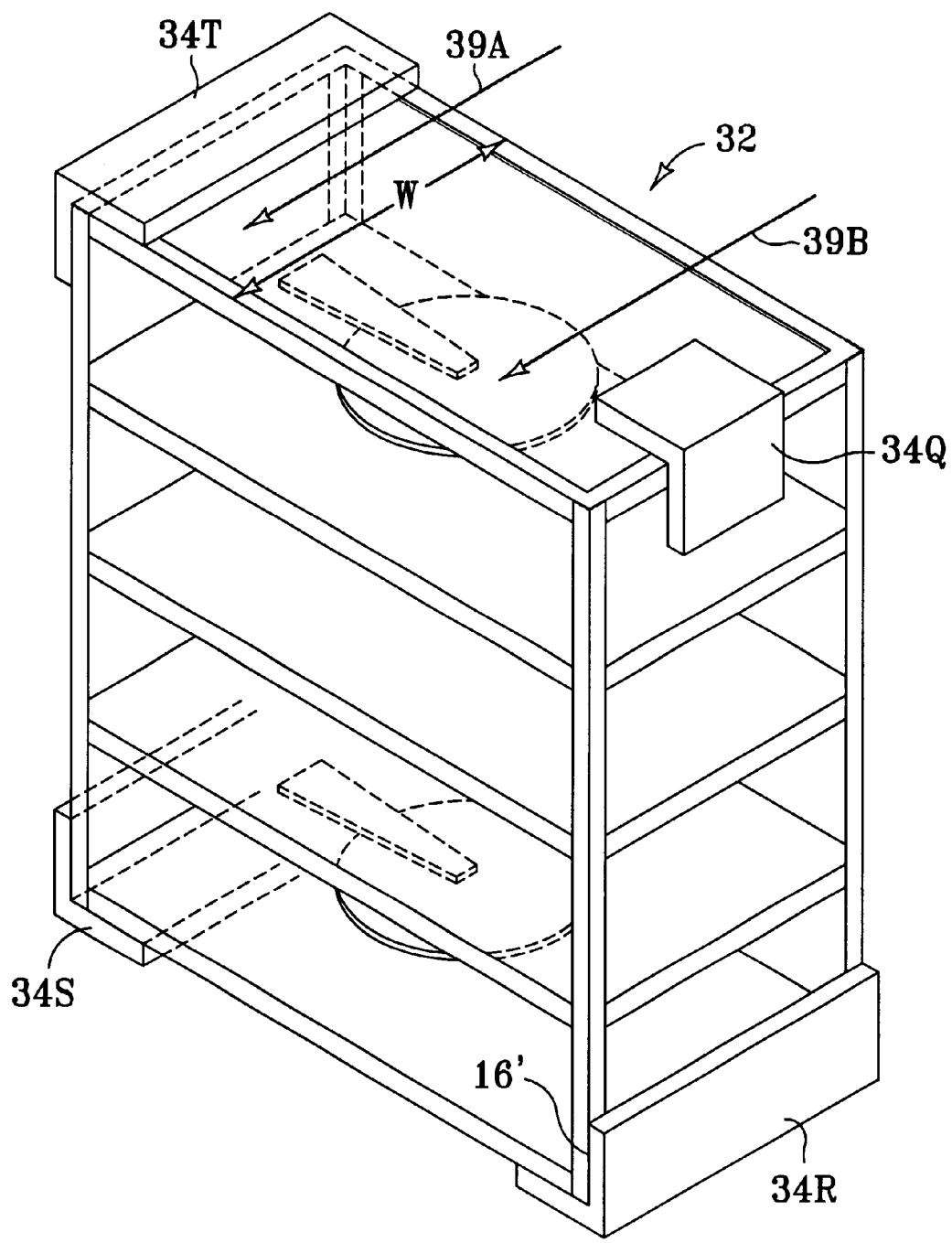
FIG. 8 is an isometric view of a DD/mounting cage/foam/ enclosure system in accordance with the present invention wherein the foam is comprised of an array of individual foam layers.
Figure 9:
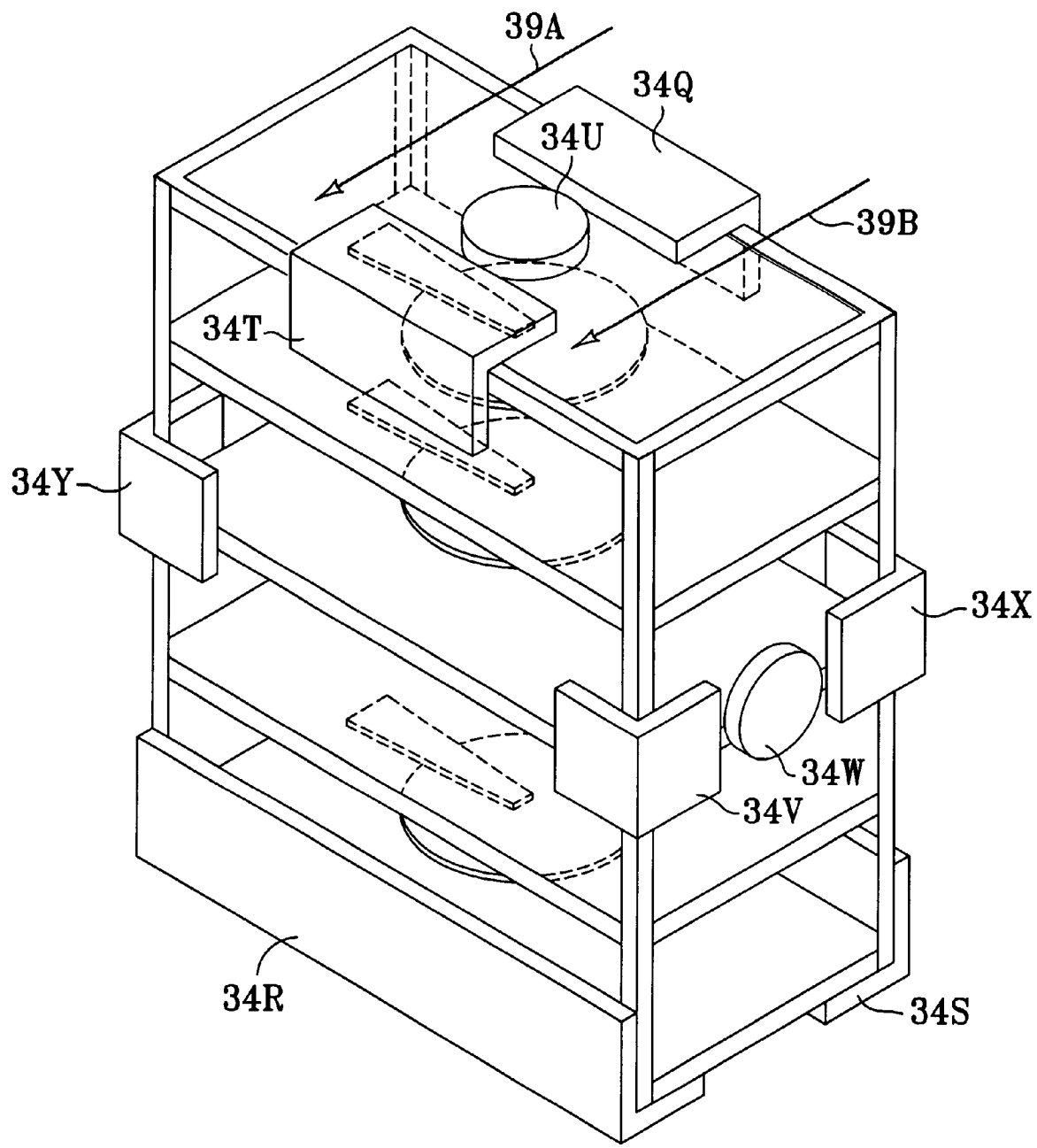
FIG. 9 is an isometric view of a DD/mounting cage/foam/ enclosure system in accordance with the present invention wherein the foam is comprised of another array of individual foam layers.

FIGS. 8 and 9 show foam enclosure systems that can be employed in the practice of this invention in various arrays of individual foam components. Such foam component arrays can comprise foam materials separated by non-damping material(s) or open space(s). In addition, two or more layers of foam can be used at these various foam layer locations. Moreover, each of the two or more layers in these diverse foam layer locations can be the same (or different) foam composition. FIG. 8, for example, depicts a DD/mounting cage assembly 32 provided with L-shaped foam layers 34Q, 34R, 34S, and 34T at each of its four corners. Each of these L-shaped foam layers 34Q, 34R, 34S and 34T can have a length that is substantially equal to the width "W" of the DD/mounting cage assembly 32. These L-shaped layers also can be shorter or longer than the width of the DD/mounting cage assembly 32. In FIG. 8 for example, L-shaped layer 34Q is only about one half of the width "W" of the DD/mounting cage assembly 32. It is somewhat preferred, however, that each such foam layer will have a length that is from about 20 to 100 percent of the length of a DD/mounting cage assembly side over which such a foam layer is placed. Moreover, each of these L-shaped layers 34Q, 34R, 34S and 34T can be made of two or more plies of a different kind of foam material. These different kinds of foam material also can have different lengths, widths and/or thicknesses. It also is to be understood that one or more of these foam layers 34Q, 34R, 34S or 34T can be in a state of compression between the DD/mounting cage assembly 32 and the enclosure system 36 that surrounds it. The direction arrows 39(A) and 39(B) shown in FIG. 8 are intended to suggest that the foam layer system 34 allows streams of air 39(A), 39(B), etc. to pass over the top of the DD/mounting cage assembly 32 since this is a particularly effective ventilation circumstance.

FIG. 9 depicts another embodiment of this invention wherein foam layers 34Q through 34Y are distributed about the DD/mounting cage assembly 32. Here again, one or more of these foam layers can be in a state of compression between said DD/mounting cage assembly 32 and the enclosure system 36 that will surround them. FIG. 9 depicts foam layers 34Q and 34T having lengths that are less than the length of the top of the DD/mounting cage assembly 32. Here again, this circumstance permits cooling streams of air 39(A), 39(B), etc. to pass over the top of the assembly 32 in order to more effectively cool the DDs it contains.

This invention also includes the use of chemically "tuned" foams to give desired damping, compliance and air porosity characteristics. Those skilled in the foam making arts will of course appreciate that foam materials can be chemically and/or compositionally designed to create void spaces of varying size and frequency between the beads of material that form the body of the foam material. The previously noted '281 patent, '642 patent and '787 patent all teach such chemically and/or compositionally tuned foams. For example, these patents teach that such void space-containing foams can be made from solid or hollow beads (including microbeads) of various resin materials. After heating these resin beads to their melting points, they become bonded together upon cooling of the melted resin materials. The end product foam materials of these patent disclosures are arrays of (1) thermally set resin elements that are interconnected and thereby serve to hold said resin in a cohesive body (2), comprising other, non-resin materials such as fibers and (3) void spaces.

The use of so-called "open-cell" foams can be preferred over the use of so-called "closed-cell" foams in the practice of this invention because open-cell foams are generally more compliant and have more and larger void spaces. Suitable foam materials for making compliant and air porous foams for the practice of this invention can be made from resin materials selected from the group consisting of polystyrene, polyethylene, polypropylene, polyesters, polyurethanes, polyamides, ethylene-vinyl acetate copolymers, polyvinyl butyral, polyvinyl butyral-polyvinyl acetate copolymers, epoxy-acrylate interpenetrating networks and the like. Such resin materials are usually "cross-linked" by cross-linking agents to enhance their strength, mechanical compliance, void space volume and temperature integrity. Examples of useful crosslinking agents for the above noted resins include, but are not limited to, those selected from the group consisting of diacrylates, triacrylates, triazines, and the like.

Again, those skilled in the foam making arts also will appreciate that the compliance and damping characteristics of the foams used in the practice of this invention can be modified as desired by creating foams having more and/or larger voids in their bodies. Creating such voids in the foam material also increases the compliance of a foam (by lowering its stiffness) without having to use a different foam, which can imply too large of a change in a desired damping or compliance characteristic. For example, an increase in compliance can be achieved by the use of foams having greater void volumes because the surrounding foam material (that normally helps prevent a foam from buckling as it is compressed) is replaced by void spaces. Thus, the self support of the foam can be reduced by providing the foam with a greater void volume. Voids can also be cut in the foam to modify (increase) the compliance of the foam, as will be discussed further below. Again, the average size of individual voids, the total void volume and the proximity of the voids to one another are all factors that can be designed by use of different resin compositions in different proportions, under different temperature, time and pressure conditions at the time of the foam's manufacture. These matters are all well within the skill of foam manufacturers.

In addition to the viscoelastic component of these resin-based foams, the end product foam materials also can include varying amounts of non-resin materials such as fibrous and/or particulate materials. The fibrous materials can be in the form of threads, cords, yarns, rovings, filaments, etc., as long as the foam's resin ingredients can wet the surface of the fiber material. The non-resin materials can also include (but are not be limited to) metallic fibrous materials, such as aluminum oxide, magnesium, or steel fibers.

As stated above, the compliance of foam elements used in the present invention can be "tuned" by forming voids in the foam by removing portions of the foam. By "compliance" we mean the lack of resistance to deformation under a load. Accordingly, as compliance of foam is increased, a constant force will cause a greater deformation of the foam. Typically, foams are rated by an "ILD" number. "ILD" stands for Indentation Load Deflection and refers to the firmness of a piece of foam (i.e., the opposite of compliance). ILD is essentially the reciprocal of "compliance". ILD is measured as follows: a 4 inch thick by 15 inch square (approx. 10 cm×38 cm×38 cm) piece of foam is placed on a flat surface. A round metal plate 12" (approx. 30.5 cm) in diameter is then pressed down on the large surface (the 15 inch×15 inch surface) of the piece of foam. The amount of force it takes to compress the foam from its 4" thickness to a thickness of 3" (approx. 19.4 cm) (corresponding to a 25% compression) is measured. This latter number is referred to as the "ILD". A low ILD, such as 10, offers little resistance to deformation, and is thus considered as a "compliant" or "soft" piece of foam. Generally, any foam with an ILD lower than about 18 is considered as being a "very soft" piece of foam. A medium foam typically has an ILD from about 19 to about 39. A foam with an ILD of about 40 to 59 is considered a firm foam. A foam having an ILD in excess of 60 is generally considered an "extra firm" piece of foam. As an example, if the force required to cause a 25% compression in the above described test specimen is 55 lb (about 30 kg), then the foam is considered a "firm" foam (i.e., a foam with a relatively low compliance as compared to a "soft" foam).

Accordingly, depending on the distance between the cage mounting (30) and the enclosure 36 (see FIGS. 3 and 4) which is to be filled with foam 34, and the anticipated forces to be dampened by the foam, as well as the weight of the cage mounting (including the DDs supported therein), a specific foam compliance (or a foam ILD) can be selected to give the most desired response of the DDs to the anticipated forces tending to affect the DDs. The foam compliance or ILD can be determined using known equations from the fields of dynamics and vibrations. Ideally, a foam ILD is chosen to minimized the average movement of the DDs resulting from the various sources of shock and vibration which can be transmitted to the DDs. However, once the preferred foam compliance (or ILD) has been calculated or otherwise determined, it is not assured that such a foam will be commercially available. For example, a foam manufacturer might only offer foams having ILDs of 23 (very compliant, or very soft), 35 (medium firmness) or 52 (firm, or not very compliant). While we have described above how a foam can be custom manufactured to provide the desired characteristics of compliance and damping, this process can be costly. Accordingly, it is preferable that a commercially available foam be used in the methods and apparatus of the present invention, and that the foam then be "tuned" to give it the compliance characteristics required to achieve the desired isolation of the DDs in the disk array system. This tuning can be accomplished by selectively forming voids in the foam. These "voids" are macroscopic in nature, and are to be distinguished from the microscopic (or very small) voids which can be essentially homogeneously distributed throughout a foam as a result of the natural manufacturing process of the foam.

Specifically, a foam having a compliance lower than desired (i.e., an ILD higher than desired) should be selected. For example, if the design process determines that a foam having an ILD of 30 should be used in a specific location (e.g., as any one of the panels used to construct the foam box 34 in FIG. 3), and the only commercially available foams have ILDs of 23 or 35, then the foam having an ILD of 35 should be selected. Thereafter, portions of the foam can be removed (by cutting or the like) to form voids to effectively increase the compliance (reduce the ILD) of the foam. That is, as portions of the foam are selectively removed to form the voids, the resistance to deformation of the foam will be decreased, and the compliance will increase (equating to a decrease in ILD of the foam). The decrease in resistance to deformation is a result of the loss of internal structural support of the foam piece due to the removal of portions of the foam piece. Further, those portions of the foam to be removed to increase compliance of the foam protecting the DDs can also be selectively removed to aid in circulation of cooling air among the DDs in the disk array. We will now discuss an example of how this can be accomplished.

Figure 10:
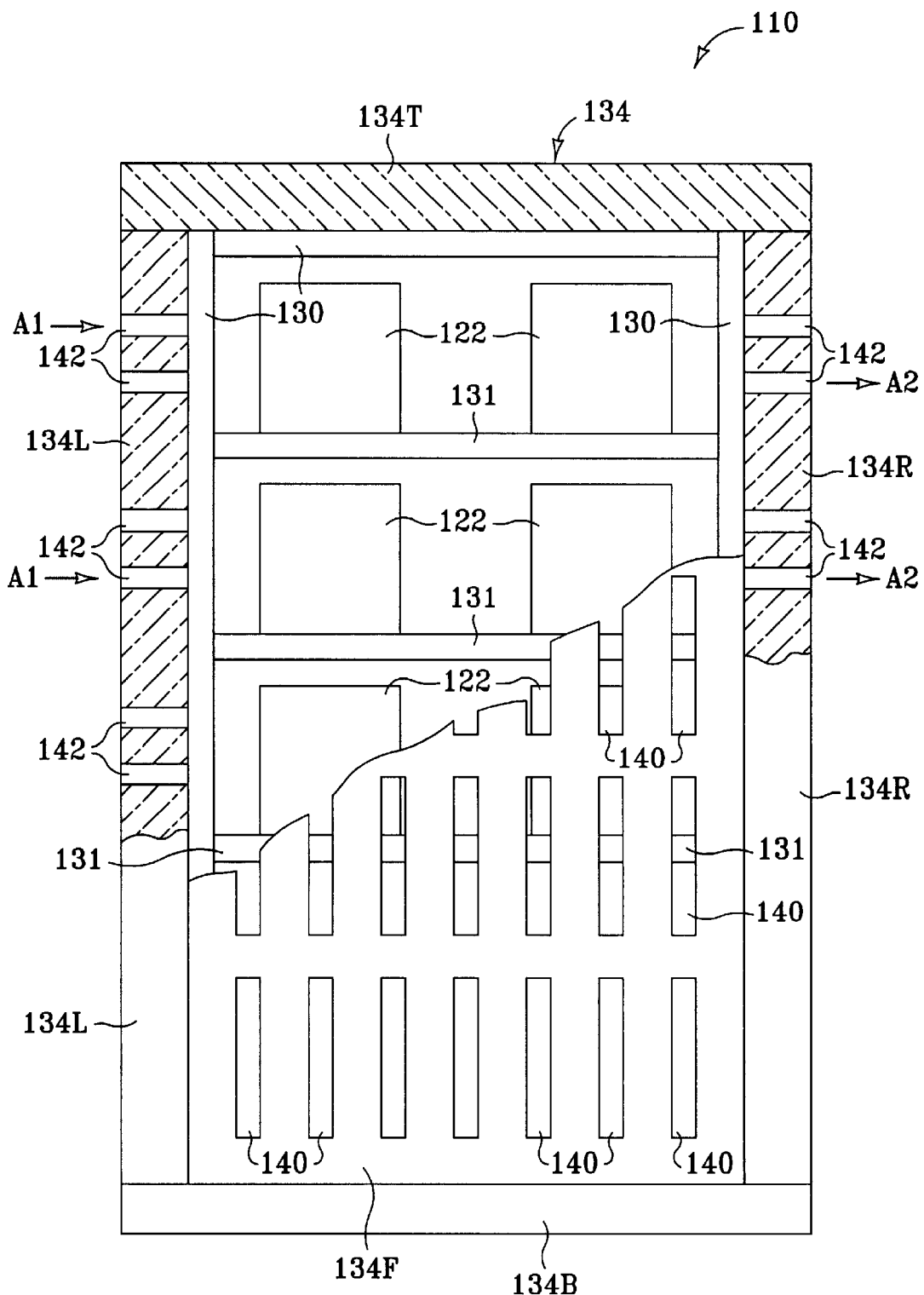
FIG. 10 depicts a front elevation partial sectional view of a DD/mounting cage/foam system showing how parts of the foam can be removed to adjust the compliance of the foam, in accordance with the present invention.

Turning to FIG. 10, a side elevation sectional view of a variation of a DD/mounting cage/foam system 110, similar to the DD/mounting cage/foam system 34 of FIGS. 3 and 4, is depicted. The DD/mounting cage/foam system 110 of FIG. 10 includes a mounting cage 130, which includes DD mounting shelves 131, which in turn support DDs 122. The mounting cage 130 is surrounded by a foam system 134, which includes a top foam piece 134T, a bottom foam piece 134B, a left side foam piece 134L, a right side foam piece 134R, and a front foam piece 134F. It is understood that the DD/mounting cage/foam system 110 of FIG. 10 can be placed inside of an enclosure similar to enclosure 36 of FIG. 4 in the manner described above. In order to "tune" the compliance of the foam system 134, voids can be selectively made in the foam system. For example, voids 142 are formed (such as by cutting or the like) through the right side foam piece 134R and the left side foam piece 134L. These voids 142 extend through the entire thickness of the foam pieces 134L and 134R, thus allowing air to flow in the direction of arrows A1 and A2 (as well as in the opposite direction), thereby facilitating the flow of cooling air across the disk drives 122. In a similar manner, voids 140 are formed in the front foam piece 134F. As is evident by the fact that the DDs 122 and the shelves 131 can be seen behind the voids 140, these voids 140 also extend through the entire thickness of the front foam piece 134F, thereby allowing cooling air to flow into (or out of) the voids 140.

Depending on how the cooling system in the disk array system is configured, voids can be selectively placed in the foam system to facilitate the channeling of cooling air to enhance the cooling effects thereof. For example, with respect to the DD/mounting cage/foam system 110 of FIG. 10, the cooling system can be configured to route cooling air between the outer surface of the foam system 134 and the enclosure (not shown), and then out through the front of the DD/mounting cage/foam system. The voids 142 in the side foam pieces 134L and 135R, and the voids 140 in the front foam piece 134F, all contribute to channeling the flow of air in this intended direction. Further, when it is known that forming selective voids in portions of the foam system can enhance the flow of cooling air to and from the DDs, or when the disk array system is specifically designed such that the foam system is intended to have voids formed therein to enhance the flow of cooling air to and from the DDs, then a foam with a higher ILD can be used for those components of the foam system.

Figure 11:
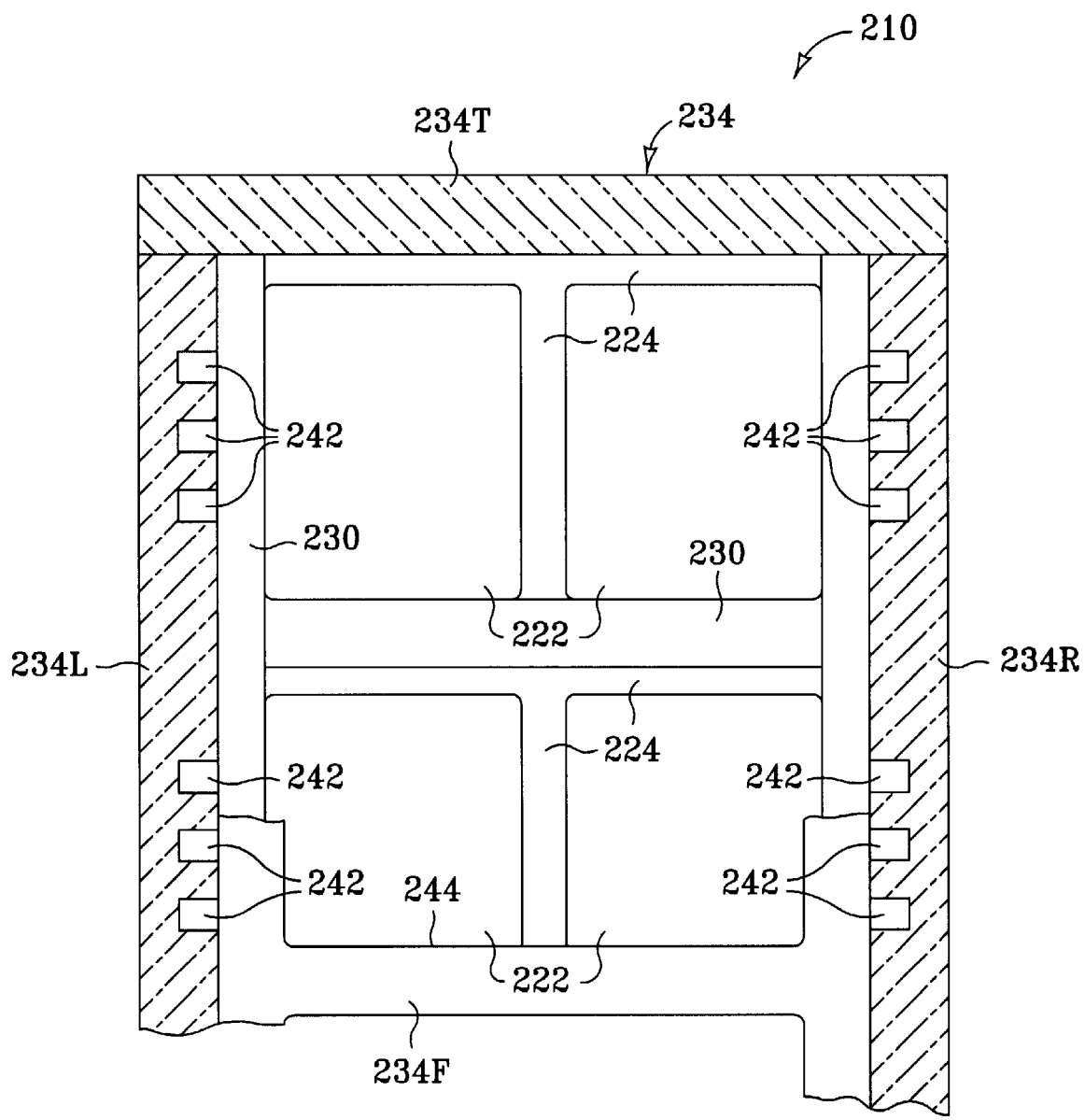
FIG. 11 depicts a front elevation partial sectional view of a DD/mounting cage/foam system showing another way in which parts of the foam can be removed to adjust the compliance of the foam, in accordance with the present invention.

Yet another example of a "tuned" foam system is shown in FIG. 11, which depicts a front elevation, partial sectional view of a DD/mounting cage/foam system 210. The system 210 includes a mounting cage 230 which can be similar to mounting cage 30 of FIG. 2. The mounting cage 230 supports DDs 222. The DDs 222 are mounted flush against the mounting cage 230 to provide additional rigidity in their mounting. The DD/mounting cage/foam system 210 further includes a foam system 234, which includes top foam piece 234T, left side foam piece 234L, right side foam piece 234R, and front foam piece 234F. As mounted in the cage 230, the DDs form void spaces 224 above and between the DDs. To increase airflow at the sides of the DDs nearest the mounting cage 230, voids 242 are formed longitudinally along the length (i.e., the dimension into the sheet of paper on which the figure is drawn) of left and right foam pieces 234L and 234R, essentially forming channels in the foam pieces 234L and 234R. Since the mounting cage 230 is preferably open along the side (see FIG. 3) air flowing in the voids 242 is free to contact the sides of the DDs 222, thus providing additional cooling for the DDs. In addition, the front foam piece 234F can have cut-out sections (indicated by edge 244) allowing cooling air to pass from the voids 224. Generally, the foam system configuration 234 depicted in FIG. 11 provides for a flow of cooling air to the DDs in a front-to-back (or back-to-front) manner in the disk array system 110, while the foam system configuration 134 depicted in FIG. 10 provides for a flow of cooling air to the DDs in a side-to-side manner in the disk array system 210.

Although the examples depicted in FIGS. 10 and 11 describe how the voids formed in the foam can be used to facilitate the flow of cooling air in the disk array systems, it should be understood that the voids do not necessary have to be sized or positioned to facilitate the flow of cooling air. For example, rather than make 3 medium sized voids 242 by each DD 222 in the side foam pieces 234L and 234R as shown in FIG. 11, a larger number of smaller voids can be used. Smaller voids will be less conducive to the flow of cooling air in the voids (due to induced turbulence), but can provide better compliance tuning characteristics versus the use of larger voids.

As mentioned previously, the design specifications of a foam system used in the present invention, and specifically the specifications of the individual components of the foam system, can be determined through known calculations once the desired performance characteristics are selected. For example, once it is determined how much compliance and damping each component of the foam system is to have to provide the desired isolation and protection of the DDs from shock and vibration, then the components of the foam system can be selected to provide these performance characteristics. Since the damping and compliance will depend on the thickness of the foam components, and since that thickness may be limited by or even dictated by the available dimensions in the overall disk array system, the foam selection process can also take into account the dimensions of the foam system components, and any pre-compression of those components, as described above. Once the specifications for each component in the foam system are determined, then foam pieces can either be custom fabricated (as described above), or commercially available foam components can be used. As also described above, when a desired foam ILD is not available, then a higher ILD foam can be used, and "tuned" to give the desired performance characteristics by selectively removing portions of the foam.

Since the characteristics (e.g., volume, shape, dimensions, location and quantity) of the voids, which are to be formed in a foam system component to "tune" (i.e., increase) the compliance of the foam component may be difficult to calculate, the void characteristics can be determined in at least two alternate methods. In one method a computer simulation can be performed using known performance criteria of the foam components, and the geometry of the foam components used in the simulation can then be changed until the desired response characteristics are achieved. The final selected geometry can then be replicated in actual foam pieces used in the foam system. An alternate method of determining the characteristics of the voids to be formed (cut) in the foam pieces to tune the compliance is by performing actual tests on foam pieces having different void patterns cut in the foam until the desired performance characteristics are achieved. Such tests can include the ILD test (described above), as well as actual tests involving DDs mounted in a foam system within an enclosure. For example, the DDs can be provided with accelerometers, and the foam system can be subjected to anticipated shock and vibration inputs. The response of the DD to these inputs can then be measured. When a foam system is tested which produces the desired response of the DDs to the shock and vibration inputs, then that foam system can be used as a design template for manufactured foam systems to be used in disk array systems. Accordingly, the present invention also provides for a method of determining voids to be formed in components of a foam system to thereby tune the compliance of such components, as described above.

In addition to forming the voids in the foam components by selectively removing portions of the foam to thereby "tune" the compliance of the foam components, the voids can also be formed by building-up a foam component from a plurality of pieces of foam having different geometries such that the resulting foam component defines the voids. Further, the voids can be formed in the foam component by manufacturing the foam component to include the voids, using known foam manufacturing techniques.

It will also be appreciated that while the foam system of the present invention has thus far been depicted as being placed between the mounting cage (e.g., 30 of FIG. 3) and an enclosure (e.g., 36 of FIG. 4), the foam system can also be placed between a disk drive (e.g., 122 of FIG. 10) and the mounting cage (e.g., 130, FIG. 10). Accordingly, the present invention also provides for a foam system for reducing shock and vibration in DDs in a disk array system, regardless of where the foam system is positioned within the disk array system. The foam system can have any of the characteristics described above, including: being a layered foam system (as depicted in FIG. 5) wherein the layers of foam have different physical properties; being custom manufactured to have desired characteristics of compliance and damping, such as by forming pockets 48 and 50 within the interior foam as depicted in FIG. 5 and described above; and having selected portions of the foam removed to increase the compliance of components in the foam system, as depicted if FIGS. 10 and 11.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A disk drive enclosure system, comprising
an enclosure;
a cage configured to mount a plurality of disk drives; and
foam between the cage and the enclosure, the foam having a plurality of voids selectively formed therein, the voids being selectively formed to tune the compliance of the foam component.

2. The disk drive enclosure system of claim 1, and wherein the foam is defined by a thickness, and wherein the voids are selectively formed through the entire thickness of the foam.

3. The disk drive enclosure system of claim 1, and wherein the foam is defined by a thickness, and wherein the voids are selectively formed through a portion of the thickness of the foam.

4. The disk drive enclosure system of claim 1, and wherein the foam comprises a plurality of foam components, and further wherein the voids are selectively formed only in selected ones of the foam components.

5. The disk drive enclosure system of claim 1, and wherein the foam is fabricated from a plurality of foam pieces having different geometries, the differences in the geometries of the foam pieces in the foam defining the voids.

6. The disk drive enclosure system of claim 1, and wherein the voids are selectively formed to create cooling air passages for cooling air circulated in the disk drive enclosure system.

7. The disk drive enclosure system of claim 1, and further comprising a plurality of disk drives mounted to the cage, and wherein the voids are located proximate the disk drives.

8. The disk drive enclosure system of claim 1, and further wherein the foam comprises a top foam piece, a left side foam piece, a right side foam piece, and a front foam piece, and wherein the voids are selectively formed in the left side foam piece and the right side foam piece.

9. A foam system to insulate disk drives from mechanical shock and vibration in a disk array system having a mounting cage configured to receive a plurality of disk drives, the foam system comprising:

a plurality of foam components configured to contact at least one of the mounting cage or the disk drives, and wherein at least one of the plurality of foam components defines a plurality of voids selectively formed therein; and the voids are selectively formed in the at least one foam component to tune the compliance of the foam component.

10. The foam system of claim 9, and further wherein the at least one foam component is defined by a thickness, and wherein the voids are selectively formed through a portion of the thickness of the foam component.

11. The foam system of claim 9, and further wherein the at least one foam component is defined by a thickness, and wherein the voids are selectively formed through the entire thickness of the foam component.

12. The foam system of claim 9, and further where in the voids are selectively formed to create cooling air passages for cooling air circulated in the disk array system.

13. A method of increasing compliance of a foam component of a foam system used in a disk array system to insulate disk drives in the disk array system from mechanical shock and vibration, comprising:

providing a foam component of the foam system; and selectively forming a plurality of voids in the foam component to thereby tune compliance of the foam component.

14. The method of claim 13, and where in the plurality of voids are selectively formed in the foam component by selectively cutting away portions of the foam component.

15. The method of claim 13, and wherein the plurality of voids are selectively formed in the foam component by forming the foam component so as to define the plurality of voids.

16. The method of claim 13, and wherein the foam component is provided as a plurality of foam pieces of different geometries, and further wherein the plurality of voids are selectively formed in the foam component by assembling the foam pieces to thereby define the voids.

17. The method of claim 13, and wherein the foam component is defined by a first compliance prior to forming the voids therein, and further wherein after the voids are formed in the foam component the foam component is defined by a second compliance, the second compliance being higher than the first compliance.

18. The method of claim 17, and wherein the second compliance is a predetermined compliance, and the voids are formed in the foam component until the second compliance is achieved.

19. The method of claim 17, and further comprising determining a desired compliance of the foam component, and wherein the voids are formed in the foam component until the compliance of the foam component is approximately equal to the desired compliance.

20. The method of claim 19, and wherein the voids are characterized by volume, shape, dimensions, quantity, and location within the foam component, the method further comprising determining at least one of the volume, shape, dimensions, quantity, and location within the foam component of the voids to determine the desired compliance of the foam component prior to forming the voids in the foam component.

21. The method of claim 20, and wherein determining at least one of the volume, shape, dimensions, quantity, and location within the foam component of the voids is accomplished by computer simulation.

* * * * *

EX PARTE REEXAMINATION CERTIFICATE (6090th)

United States Patent
Ives et al.

(10) Number: US 6,621,690 C1
(45) Certificate Issued: *Jan. 8, 2008

(54) FOAM SYSTEMS FOR PROTECTING DISK DRIVES FROM MECHANICAL DISTURBANCES

(75) Inventors: Thomas W Ives, Boise, ID (US); Donald P Roehling, Eagle, ID (US)

(73) Assignee: Hewlett-Packard Development Company, L.P., Houston, TX (US)

Reexamination Request:
No. 90/007,347, Dec. 20, 2004

Reexamination Certificate for:
Patent No.: 6,621,690
Issued: Sep. 16, 2003
Appl. No.: 09/946,433
Filed: Sep. 5, 2001

(*) Notice: This patent is subject to a terminal disclaimer.

Related U.S. Application Data

(63) Continuation-in-part of application No. 09/859,850, filed on May 16, 2001, now Pat. No. 6,567,266.

(51) Int. Cl.
*G11B 33/12* (2006.01)
*G11B 33/08* (2006.01)

(52) U.S. Cl. ........................... 361/682; 206/307
(58) Field of Classification Search .............. None
See application file for complete search history.

(56) References Cited

U.S. PATENT DOCUMENTS

| | | | | |
|---|---|---|---|---|
| 5,024,328 A | * | 6/1991 | Bontrager | 206/453 |
| 5,292,190 A | * | 3/1994 | Lautenschlager et al. | 312/330.1 |
| 5,430,607 A | * | 7/1995 | Smith | 361/683 |
| 5,596,483 A | * | 1/1997 | Wyler | 361/683 |
| 6,018,456 A | * | 1/2000 | Young et al. | 361/684 |
| 6,242,691 B1 | * | 6/2001 | Reese et al. | 174/359 |
| 6,674,609 B2 | * | 1/2004 | Boutaghou | 360/97.02 |
| 2003/0090871 A1 | | 5/2003 | Hein | |

FOREIGN PATENT DOCUMENTS

WO   WO 01/61702 A1 *  8/2006

* cited by examiner

Primary Examiner—James Menefee

(57) ABSTRACT

A disk drive enclosure system includes an enclosure, a cage configured to mount a plurality of disk drives, and foam between the cage and the enclosure. The foam is characterized by a compliance, and has a plurality of voids selectively formed therein. The voids can be selectively formed to thereby increase the compliance of the foam. The voids can be formed through the entire thickness of the foam, or through only a portion of the thickness. The voids can be configured to form cooling air passages for cooling air circulated in the disk drive enclosure system. The foam can be a foam system having foam components, and the voids can be formed only in selected ones of the foam components. The enclosure system can include a plurality of disk drives mounted to the cage, and the voids can be located near the disk drives.

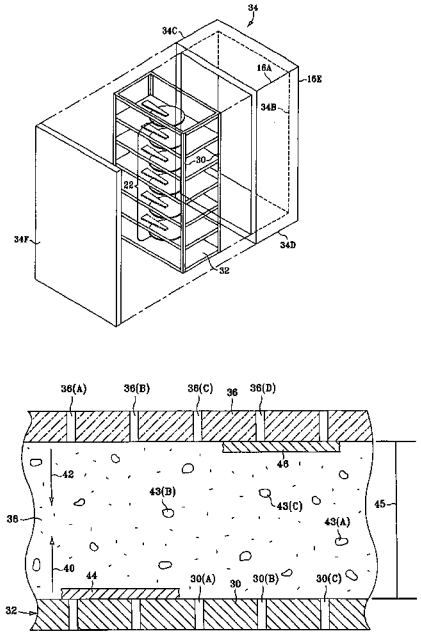

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–8 is confirmed.

Claims 9–21 are cancelled.

New claims 22–25 are added and determined to be patentable.

22. *A method of increasing compliance of a foam component of a foam system used in a disk array system to insulate disk drives in the disk array system from mechanical shock and vibration, comprising:*

*providing a foam component of the foam system, wherein the foam component is provided as a plurality of foam pieces of different geometries, and further; and*

*selectively forming a plurality of voids in the foam component to thereby tune compliance of the foam component, wherein the plurality of voids are selectively formed in the foam component by assembling the foam pieces to thereby define the voids.*

23. *A method of increasing compliance of a foam component of a foam system used in a disk array system to insulate disk drives in the disk array system from mechanical shock and vibration, comprising:*

*providing a foam component of the foam system;*

*determining a desired compliance of the foam component, wherein the voids are to be formed in the foam component until the compliance of the foam component is approximately equal to the desired compliance, and wherein the voids are characterized by volume, shape, dimensions, quantity, and location within the foam component;*

*determining at least one of the volume, shape, dimensions, quantity, and location within the foam component of the voids by computer simulation to determine the desired compliance of the foam component prior to forming the voids in the foam component; and*

*selectively forming the plurality of voids in the foam component to thereby tune compliance of the foam component.*

24. *A foam system to insulate disk drives from mechanical shock and vibration in a disk array system having a mounting cage configured to receive a plurality of disk drives, the foam system comprising:*

*a plurality of foam components configured to contact at least one of the mounting cage or the disk drives, and wherein at least one of the plurality of foam components defines a plurality of internal voids selectively formed therein; and*

*the voids are selectively formed in the at least one foam component to tune the compliance of the foam component.*

25. *A method of increasing compliance of a foam component of a foam system used in a disk array system to insulate disk drives in the disk array system from mechanical shock and vibration, comprising:*

*providing a foam component of the foam system; and*

*selectively forming a plurality of internal voids in the foam component to thereby tune compliance of the foam component.*

* * * * *